(12) United States Patent
Li et al.

(10) Patent No.: US 11,857,918 B2
(45) Date of Patent: Jan. 2, 2024

(54) LIQUID WATER HARVESTER BASED ON VALVE-CONTROLLED ACTIVE AIR SUPPLY

(71) Applicant: Harbin Institute of Technology, Heilongjiang (CN)

(72) Inventors: Songjing Li, Heilongjiang (CN); Jingxiang Zhou, Heilongjiang (CN); Teng Hua, Heilongjiang (CN); Shuai Yuan, Heilongjiang (CN); Tianhang Yang, Heilongjiang (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/121,481

(22) Filed: Mar. 14, 2023

(65) Prior Publication Data

US 2023/0302402 A1    Sep. 28, 2023

(30) Foreign Application Priority Data

Mar. 28, 2022  (CN) .......................... 202210311228.7

(51) Int. Cl.
*B01D 53/26* (2006.01)
*B01D 53/04* (2006.01)
*B01D 5/00* (2006.01)

(52) U.S. Cl.
CPC ........... *B01D 53/261* (2013.01); *B01D 5/009* (2013.01); *B01D 5/0051* (2013.01);
(Continued)

(58) Field of Classification Search
CPC .............. B01D 53/261; B01D 53/0438; B01D 53/0446; B01D 53/265; B01D 2257/80; B01D 5/0051; B01D 5/009
(Continued)

(56) References Cited

U.S. PATENT DOCUMENTS 4,602,438 A * 7/1986 Draper ...................... C10F 5/00
34/172
6,243,969 B1 * 6/2001 Yeazell .................. D06F 43/00
34/340

(Continued)

FOREIGN PATENT DOCUMENTS

| CN | 107090869 A | 8/2017 |
| CN | 107307567 A | 11/2017 |

(Continued)

*Primary Examiner* — Stephen M Gravini
(74) *Attorney, Agent, or Firm* — Dragon Sun Law Firm, PC; Nathaniel Perkins

(57) ABSTRACT

There is provided a liquid water harvester based on a valve-controlled active air supply and belongs to the field of liquid water harvesters. The present disclosure aims to address the problem of low airflow speed, high environmental humidity requirements, and auxiliary heating of an adsorption stage in the current atmospheric water harvesting technologies. In the present disclosure, the active air supply device is used to speed up the air circulation in the harvester so as to greatly shorten the adsorption time of the moisture absorbing material for the water vapor in the air and improve the heat dissipation of the micro-nano structure condensation surface. The electric valve controls the air circulation circuit and cooperates with the active air supply device. In this case, only one active air supply device can be used to complete the air supply and the condensation heat dissipation at the same time.

11 Claims, 4 Drawing Sheets

(52) U.S. Cl.
CPC ..... *B01D 53/0438* (2013.01); *B01D 53/0446* (2013.01); *B01D 53/265* (2013.01); *B01D 2257/80* (2013.01)

(58) Field of Classification Search
USPC .......................................................... 34/80
See application file for complete search history.

(56) References Cited

U.S. PATENT DOCUMENTS

| | | | | |
|---|---|---|---|---|
| 6,962,006 | B2* | 11/2005 | Chickering, III | A61K 9/1647 159/48.1 |
| 7,665,227 | B2* | 2/2010 | Wright | D06F 25/00 34/350 |
| 8,732,978 | B2* | 5/2014 | Kuan | F26B 5/005 428/300.1 |
| 8,844,160 | B2* | 9/2014 | Beihoff | D06F 58/203 34/409 |
| 10,481,325 | B2* | 11/2019 | Cui | G02B 6/04 |
| 2008/0314062 | A1* | 12/2008 | Ritchey | F28B 11/00 62/119 |
| 2010/0006281 | A1* | 1/2010 | DuBrucq | B01D 5/0009 166/371 |
| 2011/0131830 | A1* | 6/2011 | Inganas | B01L 3/50273 34/353 |
| 2022/0288505 | A1* | 9/2022 | Stuckenberg | B01D 5/0057 |

FOREIGN PATENT DOCUMENTS

| | | | |
|---|---|---|---|
| CN | 107447810 A | 12/2017 | |
| CN | 109653297 A | 4/2019 | |
| CN | 111132746 A | 5/2020 | |
| CN | 210713043 U | 6/2020 | |
| CN | 112012273 A | 12/2020 | |
| CN | 112255036 A * | 1/2021 | ........... B01D 53/261 |
| WO | 2015005791 A1 | 1/2015 | |

* cited by examiner

LIQUID WATER HARVESTER BASED ON VALVE-CONTROLLED ACTIVE AIR SUPPLY

CROSS-REFERENCE TO RELATED APPLICATION

This application claims priority from the Chinese patent application 202210311228.7 filed Mar. 28, 2022, the content of which is incorporated herein in the entirety by reference.

TECHNICAL FIELD

The present disclosure relates to a liquid water harvester.

BACKGROUND

Presently, the major atmospheric water harvesting technologies can be divided into a condensation method, a droplet harvesting method, an adsorption and desorption method, and the like based on different working principles. The adsorption and desorption method generally includes two processes. Firstly, an adsorption material is used to adsorb water vapor in the air by using a pressure difference of a surface vapor pressure of the material and a water vapor pressure as an adsorption force, and then the vapor pressure on the surface of the adsorption material is increased in a cooling device to release water vapor so as to obtain fresh water. From the above working process, it is known that an air flow efficiency in the device will directly determine the water harvesting efficiency. For example, a Chinese patent with a publication number CN112982566A discloses "an atmospheric water harvesting device based on chimney effect", where, based on the chimney effect, water in the air is harvested by using a water harvesting sail, which requires a high water vapor content in the air. A Chinese patent with the publication number CN107307567A discloses "a miniature water harvesting cup based on chimney effect", where air circulation is increased by using the chimney effect and water vapor in the air is adsorbed by using an adsorbent, with the assistance of heating in an adsorption stage. A Chinese patent with the publication number CN107447810A discloses "a miniature atmospheric water harvesting device based on adsorption and semiconductor refrigeration and a method thereof", where, by using a condensation sheet, water vapor released by desorption is cooled so as to harvest water, complicating the structure and increasing the costs.

SUMMARY

In order to address the problem of low airflow speed, high requirements for environmental humidity, and requirement for auxiliary heating of an adsorption stage in the current atmospheric water harvesting technologies, the present disclosure provides a liquid water harvester based on a valve-controlled active air supply.

In the present disclosure, the liquid water harvester based on the valve-controlled active air supply consists of an active air supply device 1, an electric valve 2, a heating film 3, a moisture absorbing material 4, a moisture absorbing material storage device 5, an inner container 6, an inner container cover 7, an external hood 8, and an external hood cover 9 and a controller.

The external hood 8 is a structure with a top end opened and a bottom end closed. The active air supply device 1 is disposed at a corner of a bottom surface inside the external hood 8. An air inlet of the active air supply device 1 penetrates through a sidewall of the external hood 8 to communicate with the outside. The electric valve 2 is disposed at the bottom surface inside the external hood 8. An air outlet of the active air supply device 1 is communicated with an air inlet of the electric valve 2. The air outlet of the active air supply device is also provided with an exit opening in a vertically upward direction. The moisture absorbing material storage device 5 is disposed at the center of the bottom surface inside the external hood 8. The moisture absorbing material storage device 5 is a structure with a top opened and a bottom closed. A plurality of groups of vertically arranged air vents 5-1 are disposed symmetrically at both sides of the moisture absorbing material storage device 5. An air outlet of the electric valve 2 faces toward the air vents 5-1 at a side of the moisture absorbing material storage device 5. The heating film 3 is disposed at a bottom surface in an inner cavity of the moisture absorbing material storage device 5. The moisture absorbing material 4 is disposed on the heating film 3 and located inside the inner cavity of the moisture absorbing material storage device 5. The top of the moisture absorbing material 4 is lower than the highest air vent 5-1. The bottom center of the inner container 6 is covered on the top of the moisture absorbing material storage device 5. The bottom center of the inner container 6 is an open structure in communication with the inner cavity of the moisture absorbing material storage device 5. The interior of the inner container 6 is a hollow structure which is formed into a water storage cavity 6-1. The inner container cover 7 is disposed at the top of the inner container 6. A micro-nano structure condensation surface is disposed on a top of an inner wall of the inner container cover 7. The micro-nano structure condensation surface is a concave-convex alternating surface, where a hydrophilic coating is disposed on a concave surface 7-2 and a hydrophobic coating is disposed on a convex surface 7-1.

The electric valve 2 is located below a side of the inner container 6. A gap is reserved between each of an outer bottom surface and an outer sidewall of the inner container 6 and an inner wall of the external hood 8, so as to form a ventilation area. The external hood cover 9 is disposed at the top of the external hood 8. The external hood cover 9 is an open structure which has an inner diameter smaller than an inner diameter of the external hood 8. The controller is disposed outside the entire harvester. A signal output end of the controller is respectively connected to a signal input end of the active air supply device 1, a signal input end of the electric valve 2, and a signal input end of the heating film 3.

The use method and working principle of the liquid water harvester based on the valve-controlled active air supply in the present disclosure are described below.

In an adsorption state, when water in the air is to be harvested, the controller starts the active air supply device 1 to supply the air containing water vapor outside the harvester into the harvester; at the same time, the controller starts the electric valve 2 and at this time the heating film 3 is in an off state; a part of the air is exhausted out of the harvester upward through the ventilation area between the inner container 6 and the external hood 8 (as shown by the left arrow in FIG. 1), and another part of the air enters the moisture absorbing material storage device 5 through the air vents 5-1 close to the electric valve 2; after being fully contacted with the moisture absorbing material 4, the air flows out of the air vents 5-1 away from the electric valve 2 and is exhausted out of the harvester upward through the ventilation area between the inner container 6 and the external hood 8 (as shown by the right arrow in FIG. 1); and thus, water vapor in the air is adsorbed by the moisture absorbing material 4.

In a desorption stage, when the moisture absorbing material 4 is saturated over a period of adsorption, the controller closes the electric valve 2 such that an air passage between the active air supply device 1 and the moisture absorbing material storage device 5 is cut off; thus, the air is all exhausted out of the harvester upward through the ventilation area between the inner container 6 and the external hood 8 upward (as shown by the left arrow in FIG. 1); the controller starts the heating film 4 to start heating, and the moisture absorbing material 4 releases the adsorbed water vapor therein at a high temperature provided by the heating film 3 and exhausts it upward to the inner container 6; the water vapor is condensed into water on the micro-nano structure condensation surface, and further, the water can be removed at a higher rate due to presence of the hydrophilic coating disposed on the concave surface 7-2 and the hydrophobic coating disposed on the convex surface 7-1 on the micro-nano structure condensation surface; thus, the water drops can gradually fall into the water storage cavity 6-1; therefore, the desorption stage is completed, and the heating film 3 and the active air supply device 1 are turned off.

After the desorption stage is completed, the adsorption and desorption cycle can be repeated.

When the harvester provided by the present disclosure is used, the controller may control a time of the adsorption stage and a time of the desorption stage by timing a control circuit. In other words, the working times of the active air supply device 1, the electric valve 2 and the heating film 3 can be controlled respectively without human interference, leading to a high automation degree.

In the present disclosure, the inner diameter of the external hood cover 9 is smaller than the inner diameter of the external hood 8, such that the air supplied through the ventilation area between the inner container 6 and the external hood 8 can fully contact with the external surface of the inner container cover 7 and then flow out, thereby increasing the cooling effect.

The harvester of the present disclosure has the following advantages.

1. The harvester in the present disclosure can absorb water vapor from the air and produce liquid water in an environmental-friendly and energy-saving manner. Meanwhile, the harvester features small volume, ease of integration, and ease of carry.
2. The liquid water harvester of the present disclosure uses the controller to control the start of the entire machine without human interference, having a high degree of automation.
3. The liquid water harvester of the present disclosure uses the active air supply device 1 to speed up the adsorption of the moisture absorbing material for water vapor and the heat dissipation of the condensation surface of the inner container cover 7, thereby entirely improving the harvesting efficiency.
4. The liquid water harvester of the present disclosure, in cooperation with the electric valve 2 and the active air supply device 1, completes the active air supply and the heat dissipation of the condensation surface by only one active air supply device 1. The harvester has the advantages of simple structure, small volume, low costs, ease of integration, ease of carry, and high water harvesting efficiency.
5. The condensation surface of the inner container cover 7 of the present disclosure adopts a special micro-nano structure surface, such that the water vapor adsorption, condensation, and harvesting efficiency can be improved by the use of the hydrophilic and hydrophobic effect of the hydrophilic concave surface and hydrophobic convex surface.
6. The liquid water harvester of the disclosure has beneficial application prospects in the fields such as automatic irrigation, automatic water supplementation, humidifier, individual combat supply and field survival emergency, and the like.

BRIEF DESCRIPTIONS OF THE DRAWINGS

DETAILED DESCRIPTIONS OF EMBODIMENTS

Figure 1:
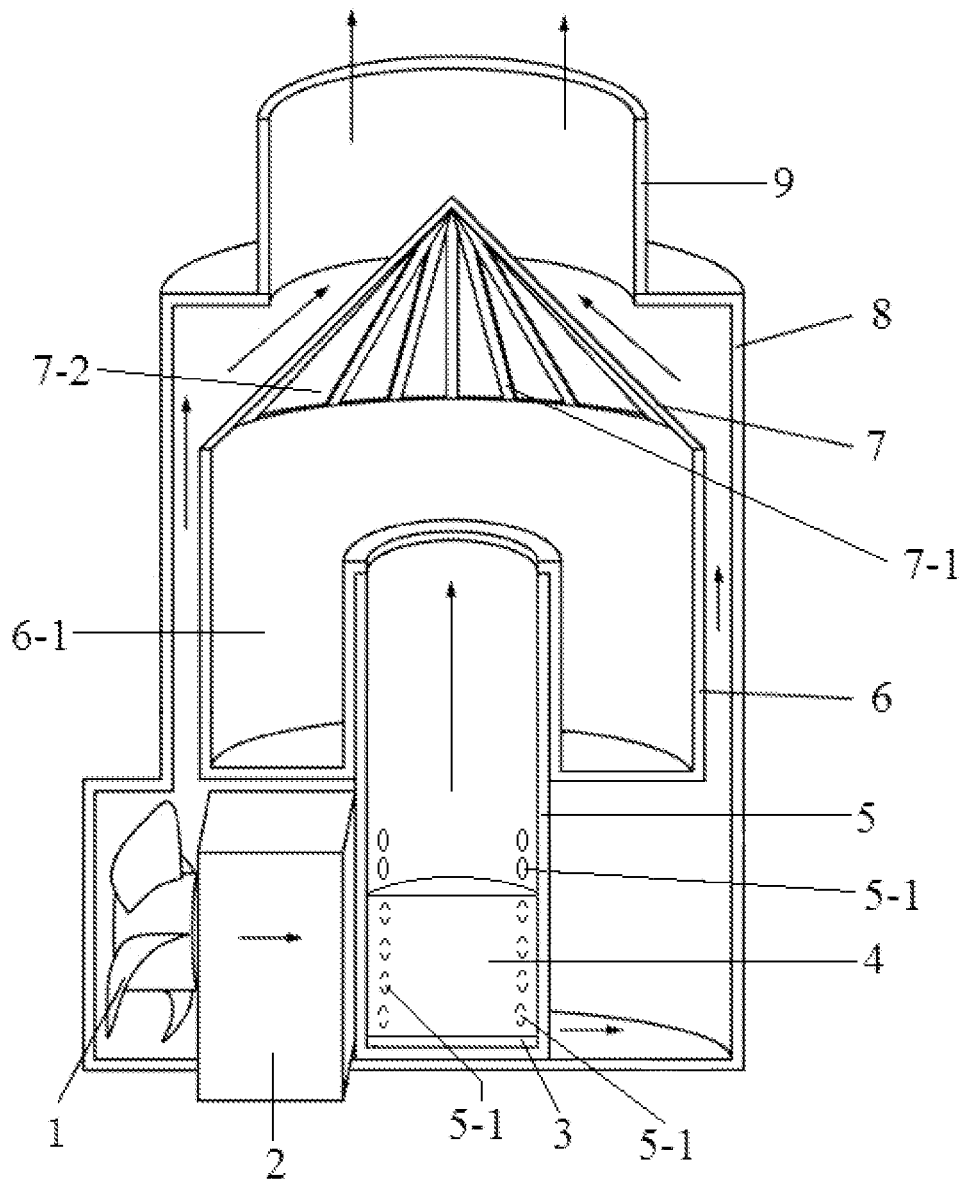
FIG. 1 is a schematic diagram illustrating a liquid water harvester based on a valve-controlled active air supply according to a first embodiment of the present disclosure.
Figure 2:
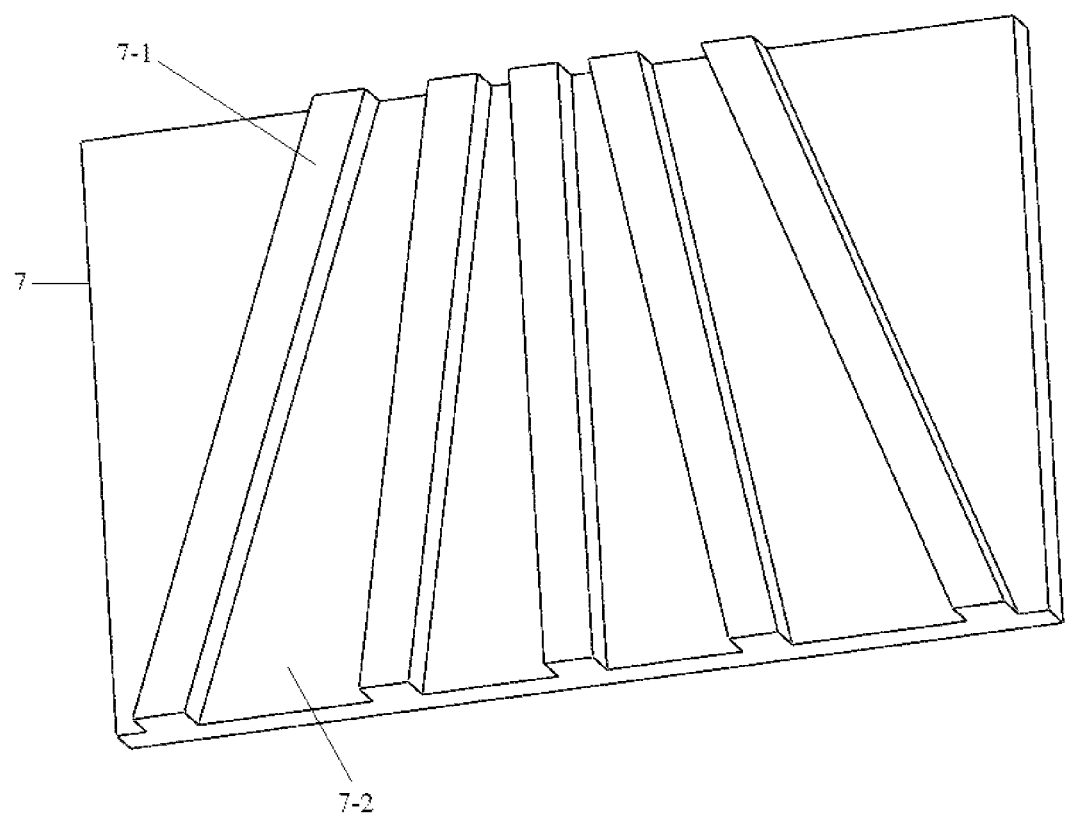
FIG. 2 is a partial schematic diagram illustrating an inner container cover 7 with an expanded inner wall according to a first embodiment of the present disclosure.
Figure 3:
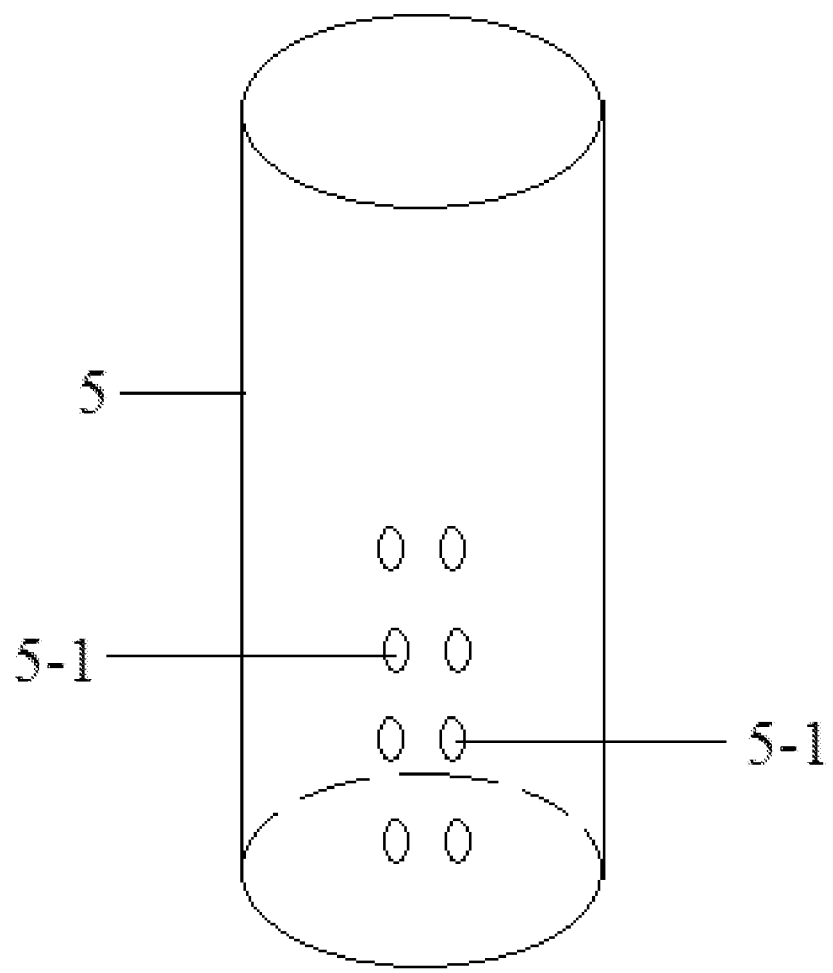
FIG. 3 is a left view of a material absorbing material storage device 5 in FIG. 1.
Figure 4:
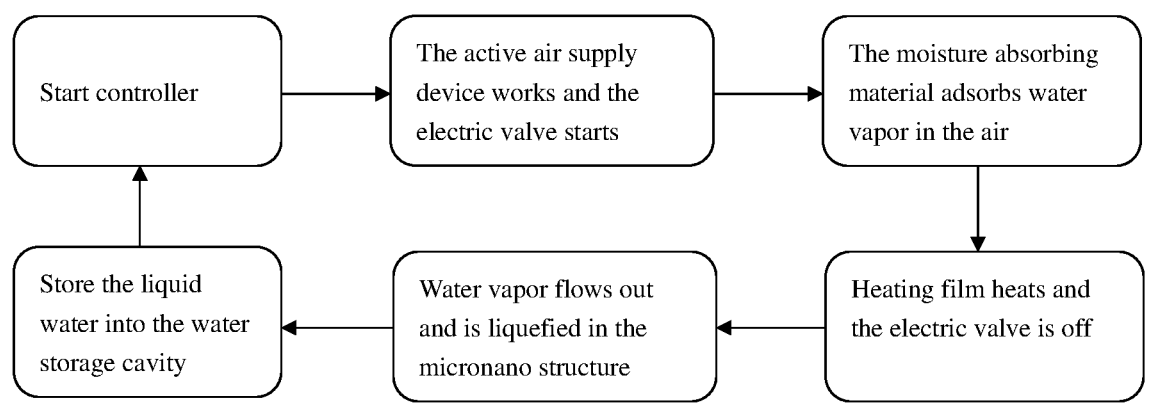
FIG. 4 is a block diagram illustrating a working principle of a liquid water harvester based on a valve-controlled active air supply according to a first embodiment of the present disclosure.

In a first embodiment: this embodiment is a liquid water harvester based on a valve-controlled active air supply. As shown in FIGS. 1 to 4, the harvester consists of an active air supply device 1, an electric valve 2, a heating film 3, a moisture absorbing material 4, a moisture absorbing material storage device 5, an inner container 6, an inner container cover 7, an external hood 8, and an external hood cover 9 and a controller.

The external hood 8 is a structure with a top end opened and a bottom end closed. The active air supply device 1 is disposed at a corner of a bottom surface inside the external hood 8. An air inlet of the active air supply device 1 penetrates through a sidewall of the external hood 8 to communicate with the outside. The electric valve 2 is disposed at the bottom surface inside the external hood 8. An air outlet of the active air supply device 1 is communicated with an air inlet of the electric valve 2. The air outlet of the active air supply device is also provided with an exit opening in a vertically upward direction. The moisture absorbing material storage device 5 is disposed at the center of the bottom surface inside the external hood 8. The moisture absorbing material storage device 5 is a structure with a top opened and a bottom closed. A plurality of groups of vertically-arranged air vents 5-1 are disposed symmetrically at both sides of the moisture absorbing material storage device 5. An air outlet of the electric valve 2 faces toward the air vents 5-1 at a side of the moisture absorbing material storage device 5. The heating film 3 is disposed at a bottom surface in an inner cavity of the moisture absorbing material storage device 5. The moisture absorbing material 4 is disposed on the heating film 3 and located inside the inner cavity of the moisture absorbing material storage device 5. The top of the moisture absorbing material 4 is lower than the highest air vent 5-1. The bottom center of the inner container 6 is covered on the top of the moisture absorbing material storage device 5. The bottom center of the inner container 6 is an open structure in communication with the inner cavity of the moisture absorbing material storage device 5. The interior of the inner container 6 is a hollow structure which is formed into a water storage cavity 6-1. The inner container cover 7 is disposed at the top of the inner container 6. A micro-nano structure condensation surface is disposed on a top of an inner wall of the inner container cover 7. The micro-nano structure condensation surface is a concave-convex alternating surface, where a hydrophilic coating is disposed on a concave surface 7-2 and a hydrophobic coating is disposed on a convex surface 7-1.

The electric valve 2 is located below a side of the inner container 6. a gap is reserved between each of an outer bottom surface and an outer sidewall of the inner container 6 and an inner wall of the external hood 8, so as to form a ventilation area. The external hood cover 9 is disposed at the top of the external hood 8. The external hood cover 9 is an open structure which has an inner diameter smaller than an inner diameter of the external hood 8. The controller is disposed outside the entire harvester. A signal output end of the controller is respectively connected to a signal input end of the active air supply device 1, a signal input end of the electric valve 2 and a signal input end of the heating film 3.

The use method and working principle of the liquid water harvester based on the valve-controlled active air supply in this embodiment are described below.

In an adsorption state, when water in the air is to be harvested, the controller starts the active air supply device 1 to supply the air containing water vapor outside the harvester into the harvester; at the same time, the controller starts the electric valve 2 and at this time the heating film 3 is in an off state; a part of the air is exhausted out of the harvester upward through the ventilation area between the inner container 6 and the external hood 8 (as shown by the left arrow in FIG. 1), and another part of the air enters the moisture absorbing material storage device 5 through the air vents 5-1 close to the electric valve 2; after being fully contacted with the moisture absorbing material 4, the air flows out of the air vents 5-1 away from the electric valve 2 and is exhausted out of the harvester upward through the ventilation area between the inner container 6 and the external hood 8 (as shown by the right arrow in FIG. 1); and thus, water vapor in the air is adsorbed by the moisture absorbing material 4.

In a desorption stage, when the moisture absorbing material 4 is saturated over a period of adsorption, the controller closes the electric valve such that an air passage between the active air supply device 1 and the moisture absorbing material storage device 5 is cut off; thus, the air is all exhausted out of the harvester upward through the ventilation area between the inner container 6 and the external hood 8 (as shown by the left arrow in FIG. 1); the controller starts the heating film 4 to start heating, and the moisture absorbing material 4 releases the adsorbed water vapor therein at a high temperature provided by the heating film 3 and exhausts it upward to the inner container 6; the water vapor is condensed into water on the micro-nano structure condensation surface of the inner container cover 7, and further, the water can be removed at a higher rate due to presence of the hydrophilic coating disposed on the concave surface 7-2 and the hydrophobic coating disposed on the convex surface 7-1 on the micro-nano structure condensation surface; thus, the water drops can gradually fall into the water storage cavity 6-1; therefore, the desorption stage is completed, and the heating film 3 and the active air supply device 1 are turned off.

After the desorption stage is completed, the adsorption and desorption cycle can be repeated.

When the harvester provided by this embodiment is used, the controller may control a time of the adsorption stage and a time of the desorption stage by timing a control circuit. In other words, the working times of the active air supply device 1, the electric valve 2 and the heating film 3 can be controlled respectively without human interference, leading to a high degree of automation.

In this embodiment, the inner diameter of the external hood cover 9 is smaller than the inner diameter of the external hood 8, such that the air supplied through the ventilation area between the inner container 6 and the external hood 8 can fully contact with the external surface of the inner container cover 7 and then flow out, thereby increasing the cooling effect.

The harvester of the present embodiment has the following advantages.

1. The harvester in the present embodiment can absorb water vapor from the air and produce liquid water in an environmental-friendly and energy-saving manner. Meanwhile, the harvester features small volume, ease of integration, and ease of carry.
2. The liquid water harvester of the present embodiment uses the controller to control the start of the entire machine without human interference, having a high degree of automation.
3. The liquid water harvester of the present embodiment uses the active air supply device 1 to speed up the adsorption of the moisture absorbing material for water vapor and the heat dissipation of the condensation surface of the inner container cover 7, thereby entirely improving the harvesting efficiency.
4. The liquid water harvester of the present embodiment, in cooperation with the electric valve 2 and the active air supply device 1, completes the active air supply and the heat dissipation of the condensation surface by only one active air supply device 1. The harvester has the advantages of simple structure, small volume, low costs, ease of integration, ease of carry, and high water harvesting efficiency.
5. The condensation surface of the inner container cover 7 of the present embodiment adopts a special micro-nano structure surface, such that the water vapor adsorption, condensation, and harvesting efficiency can be improved by the use of the hydrophilic and hydrophobic effect of the hydrophilic concave surface and hydrophobic convex surface.
6. The embodiment's liquid water harvester has good application prospects in fields such as automatic irrigation, automatic water supplementation, humidifier, individual combat supply and field survival emergency, and the like.

In a second embodiment: this embodiment is the same as the first embodiment except that: the active air supply device 1 is a motor, an air pump, or a fan used to speed up the adsorption of the absorbing material 4 for water vapor and the heat dissipation of the condensation surface.

In a third embodiment: this embodiment is the same as the first or second embodiment except that: the electric valve 2 is a ball valve or a butterfly valve, which cooperates with the active air supply device 1 to switch between air supply and condensation heat dissipation; and only one air supply device 1 can be used to complete air supply and condensation heat dissipation at the same time.

In a fourth embodiment: this embodiment is the same as the first to third embodiment, except that: the moisture absorbing material 4 is silica gel, molecular sieve or hydrogel, which all have good adsorption for water and can release the adsorbed water under heating conditions so as to achieve desorption function; the moisture absorbing material 4 is placed inside the moisture absorbing material storage device 5 and located on the heating film 3 to adsorb water vapor in the air; during an adsorption process, the moisture absorbing material 4 adsorbs water vapor in the air; and in a desorption process (i.e. when the electric valve 2 is closed), the moisture absorbing material 4, under the action of the heating film 3, releases the high temperature water vapor upward into the inner container 6 along the inner cavity of the moisture absorbing material storage device 5, and the high temperature water vapor is condensed on the micro-nano structure condensation surface of the inner container cover 7.

In a fifth embodiment: this embodiment is the same as the first embodiment except that the heating film is a PI electrothermal film, graphene, or ceramic heating sheet, which is in contact with the lower surface of the moisture absorbing material 4 to heat the moisture absorbing material 4 to enable the moisture absorbing material 4 to release the adsorbed moisture; At the temperature of 373K, the moisture absorbing material 4 can complete desorption within about 30 minutes.

In a sixth embodiment: this embodiment is the same as the first embodiment except that a material of the inner container 6 is a high-temperature-resistant and non-toxic organic material.

In a seventh embodiment: this embodiment is the same as the first embodiment except that the material of the inner container cover 7 is a high-temperature-resistant and non-toxic organic material.

In an eighth embodiment: this embodiment is the same as the sixth or seventh embodiment except that the material of the inner container 6 and the inner container cover 7 is acrylic.

In a ninth embodiment: this embodiment is the same as the first embodiment except that the hydrophilic coating is PSBMA ultra-hydrophilic coating.

In a tenth embodiment: this embodiment is the same as the first embodiment except that the hydrophobic coating is PDMS ultra-hydrophobic coating.

The present disclosure will be verified by the following test.

Test 1: this test provides a liquid water harvester based on a valve-controlled active air supply. As shown in FIGS. 1 to 4, the harvester consists of an active air supply device 1, an electric valve 2, a heating film 3, a moisture absorbing material 4, a moisture absorbing material storage device 5, an inner container 6, an inner container cover 7, an external hood 8, and an external hood cover 9 and a controller.

The active air supply device 1 is a motor; the electric valve 2 is a ball valve; the moisture absorbing material 4 is silica gel; the heating film 3 is a PI electrothermal film; the material of the inner container 6 and the inner container cover 7 is acrylic.

The external hood 8 is a structure with a top end opened and a bottom end closed. The active air supply device 1 is disposed at a corner of a bottom surface inside the external hood 8. An air inlet of the active air supply device 1 penetrates through a sidewall of the external hood 8 to communicate with the outside. The electric valve 2 is disposed at the bottom surface inside the external hood 8. An air outlet of the active air supply device 1 is communicated with an air inlet of the electric valve 2. The air outlet of the active air supply device is also provided with an exit opening in a vertically upward direction. The moisture absorbing material storage device 5 is disposed at the center of the bottom surface inside the external hood 8. The moisture absorbing material storage device 5 is a structure with a top opened and a bottom closed. A plurality of groups of vertically-arranged air vents 5-1 are disposed symmetrically at both sides of the moisture absorbing material storage device 5. An air outlet of the electric valve 2 faces toward the air vents 5-1 at a side of the moisture absorbing material storage device 5. The heating film 3 is disposed at a bottom surface in an inner cavity of the moisture absorbing material storage device 5. The moisture absorbing material 4 is disposed on the heating film 3 and located inside the inner cavity of the moisture absorbing material storage device 5. The top of the moisture absorbing material 4 is lower than the highest air vent 5-1. The bottom center of the inner container 6 is covered on the top of the moisture absorbing material storage device 5. The bottom center of the inner container 6 is an open structure in communication with the inner cavity of the moisture absorbing material storage device 5. The interior of the inner container 6 is a hollow structure which is formed into a water storage cavity 6-1. The inner container cover 7 is disposed at the top of the inner container 6. A micro-nano structure condensation surface is disposed on a top of an inner wall of the inner container cover 7. The micro-nano structure condensation surface is a concave-convex alternating surface, where an ultra-hydrophilic coating PSBMA is disposed on a concave surface 7-2 and an ultra-hydrophobic coating PDMS is disposed on a convex surface 7-1; the concave surface 7-2 and the convex surface 7-1 both are strip-shaped (see FIG. 2).

The electric valve 2 is located below a side of the inner container 6. A gap is reserved between each of an outer bottom surface and an outer sidewall of the inner container 6 and an inner wall of the external hood 8, so as to form a ventilation area. The external hood cover 9 is disposed at the top of the external hood 8. The external hood cover 9 is an open structure which has an inner diameter smaller than an inner diameter of the external hood 8. The controller is disposed outside the entire harvester. A signal output end of the controller is respectively connected to a signal input end of the active air supply device 1, a signal input end of the electric valve 2 and a signal input end of the heating film 3.

The use method and working principle of the liquid water harvester based on the valve-controlled active air supply in this test are described below.

In an adsorption state, when water in the air is to be harvested, the controller starts the active air supply device 1 to supply the air containing water vapor outside the harvester into the harvester; at the same time, the controller starts the electric valve 2 and at this time the heating film 3 is in an off state; a part of the air is exhausted out of the harvester upward through the ventilation area between the inner container 6 and the external hood 8 (as shown by the left arrow in FIG. 1), and another part of the air enters the moisture absorbing material storage device 5 through the air vents 5-1 close to the electric valve 2; after being fully contacted with the moisture absorbing material 4, the air flows out of the air vents 5-1 away from the electric valve 2 and is exhausted out of the harvester upward through the ventilation area between the inner container 6 and the external hood 8 (as shown by the right arrow in FIG. 1); and thus, water vapor in the air is adsorbed by the moisture absorbing material 4.

In a desorption stage, when the moisture absorbing material 4 is saturated over a period of adsorption, the controller closes the electric valve such that an air passage between the active air supply device 1 and the moisture absorbing material storage device 5 is cut off; thus, the air is all exhausted out of the harvester upward through the ventilation area between the inner container 6 and the external hood 8 (as shown by the left arrow in FIG. 1); the controller starts the heating film 4 to start heating, and the moisture absorbing material 4 releases the adsorbed water vapor therein at a high temperature provided by the heating film 3 and exhausts it upward to the inner container 6; the water vapor is condensed into water on the micro-nano structure condensation surface of the inner container cover 7, and further, the water can be removed at a higher rate due to presence of the hydrophilic coating disposed on the concave surface 7-2 and the hydrophobic coating disposed on the convex surface 7-1 on the micro-nano structure condensation surface; thus, the water drops can gradually fall into the water storage cavity 6-1; therefore, the desorption stage is completed, and the heating film 3 and the active air supply device 1 are turned off.

After the desorption stage is completed, the adsorption and desorption cycle can be repeated.

When the harvester provided by this test is used, the controller may control a time of the adsorption stage and a time of the desorption stage by timing a control circuit. In other words, the working times of the active air supply device 1, the electric valve 2 and the heating film 3 can be controlled respectively without human interference, leading to a high degree of automation.

In this test, the inner diameter of the external hood cover 9 is smaller than the inner diameter of the external hood 8, such that the air supplied through the ventilation area between the inner container 6 and the external hood 8 can fully contact with the external surface of the inner container cover 7 and then flow out, thereby increasing the cooling effect.

The harvester of the test has the following advantages.
1. The harvester in the test can absorb water vapor from the air and produce liquid water in an environmental-friendly and energy-saving manner. Meanwhile, the harvester features small volume, ease of integration, and ease of carry.
2. The liquid water harvester of the test uses the controller to control the start of the entire machine without human interference, having a high degree of automation.
3. The liquid water harvester of the test uses the active air supply device 1 to speed up the adsorption of the moisture absorbing material for water vapor and the heat dissipation of the condensation surface of the inner container cover 7, thereby entirely improving the harvesting efficiency.
4. The liquid water harvester of the test, in cooperation with the electric valve 2 and the active air supply device 1, completes the active air supply and the heat dissipation of the condensation surface by only one active air supply device 1. The harvester has the advantages of simple structure, small volume, low costs, ease of integration, ease of carry, and high water harvesting efficiency.
5. The condensation surface of the inner container cover 7 of the test adopts a special micro-nano structure surface, such that the water vapor adsorption, condensation, and harvesting efficiency can be improved by the use of the hydrophilic and hydrophobic effect of the hydrophilic concave surface and hydrophobic convex surface.
6. The liquid water harvester of the test has good application prospects in the fields such as automatic irrigation, automatic water supplementation, humidifier, individual combat supply and field survival emergency, and the like.

What is claimed is:

1. A liquid water harvester based on a valve-controlled active air supply,
   comprising an active air supply device (1), an electric valve (2), a heating film (3), a moisture absorbing material (4), a moisture absorbing material storage device (5), an inner container (6), an inner container cover (7), an external hood (8), and an external hood cover (9) and a controller;
   wherein the external hood (8) is a structure with a top end opened and a bottom end closed; the active air supply device (1) is disposed at a corner of a bottom surface inside the external hood (8); an air inlet of the active air supply device (1) penetrates through a sidewall of the external hood (8); the electric valve (2) is disposed at the bottom surface inside the external hood (8); an air outlet of the active air supply device (1) is communicated with an air inlet of the electric valve (2); the air outlet of the active air supply device (1) is also provided with an exit opening in a vertical upward direction; the moisture absorbing material storage device (5) is disposed at a center of the bottom surface inside the external hood (8); the moisture absorbing material storage device (5) is a structure with a top opened and a bottom closed; a plurality of groups of vertically-arranged air vents (5-1) are disposed symmetrically at both sides of the moisture absorbing material storage device 5; an air outlet of the electric valve (2) faces toward the air vents (5-1) at a side of the moisture absorbing material storage device (5); the heating film (3) is disposed at a bottom surface in an inner cavity of the moisture absorbing material storage device (5); the moisture absorbing material (4) is disposed on the heating film (3) and located inside the inner cavity of the moisture absorbing material storage device (5); a top of the moisture absorbing material (4) is lower than the highest air vent (5-1); the bottom center of the inner container (6) is covered on the top of the moisture absorbing material storage device (5); the bottom center of the inner container (6) is an open structure in communication with the inner cavity of the moisture absorbing material storage device (5); the interior of the inner container (6) is a hollow structure which is formed into a water storage cavity (6-1); the inner container cover (7) is disposed at a top of the inner container (6); a micro-nano structure condensation surface is disposed on a top of an inner wall of the inner container cover (7); the micro-nano structure condensation surface is a concave-convex alternating surface, where a hydrophilic coating is disposed on a concave surface (7-2) and a hydrophobic coating is disposed on a convex surface (7-1);
   the electric valve (2) is located below a side of the inner container (6); a gap is reserved between each of an outer bottom surface and an outer sidewall of the inner container (6) and an inner wall of the external hood (8), so as to form a ventilation area; the external hood cover (9) is disposed at a top of the external hood (8); the external hood cover (9) is an open structure which has an inner diameter smaller than an inner diameter of the external hood (8); a signal output end of the controller is respectively connected to a signal input end of the active air supply device (1), a signal input end of the electric valve (2) and a signal input end of the heating film (3).

2. The liquid water harvester of claim 1, wherein the active air supply device (1) is a motor, an air pump, or a fan.

3. The liquid water harvester of claim 1, wherein the electric valve (2) is a ball valve or butterfly valve.

4. The liquid water harvester of claim 1, wherein the moisture absorbing material (4) is silica gel, molecular sieve, or hydrogel.

5. The liquid water harvester of claim 1, wherein the heating film (3) is a PI electrothermal film, graphene, or ceramic heating sheet.

6. The liquid water harvester of claim 1, wherein the inner container (6) is a high-temperature-resistant and non-toxic organic material.

7. The liquid water harvester of claim 1, wherein a material of the inner container cover (7) is a high-temperature-resistant and non-toxic organic material.

8. The liquid water harvester of claim 6, wherein a material of the inner container (6) and the inner container cover (7) is acrylic.

9. The liquid water harvester of claim 1, wherein the hydrophilic coating is PSBMA ultra-hydrophilic coating.

10. The liquid water harvester of claim 1, wherein the hydrophobic coating is PDMS ultra-hydrophobic coating.

11. The liquid water harvester of claim 7, wherein a material of the inner container (6) and the inner container cover (7) is acrylic.

* * * * *